United States Patent [19]

Cornett et al.

[11] 4,184,327

[45] Jan. 22, 1980

[54] METHOD AND APPARATUS FOR RAPID THRUST INCREASES IN A TURBOFAN ENGINE

[75] Inventors: Jack E. Cornett, Cincinnati; Ralph C. Corley, Wyoming; Thomas O. Fraley, Middletown; Andrew A. Saunders, Jr., Cincinnati, all of Ohio

[73] Assignee: The United States of America as represented by the Administrator of the National Aeronautics and Space Administration, Washington, D.C.

[21] Appl. No.: 858,936

[22] Filed: Dec. 9, 1977

[51] Int. Cl.[2] .................... F02K 3/04; F02C 9/04; F02C 9/14

[52] U.S. Cl. .................... 60/240; 60/39.03; 60/39.27

[58] Field of Search .............. 60/240, 39.27, 39.03

[56] References Cited

U.S. PATENT DOCUMENTS 3,797,233  3/1974  Webb et al. ........................ 60/240

*Primary Examiner*—Robert E. Garrett
*Attorney, Agent, or Firm*—Dana F. Bigelow; Derek P. Lawrence; Norman T. Musial

[57] ABSTRACT

Upon a landing approach, the normal compressor stator schedule of a fan speed controlled turbofan engine is temporarily varied to substantially close the stators to thereby increase the fuel flow and compressor speed in order to maintain fan speed and thrust. This running of the compressor at an off-design speed substantially reduces the time required to subsequently advance the engine speed to the takeoff thrust level by advancing the throttle and opening the compressor stators.

26 Claims, 6 Drawing Figures

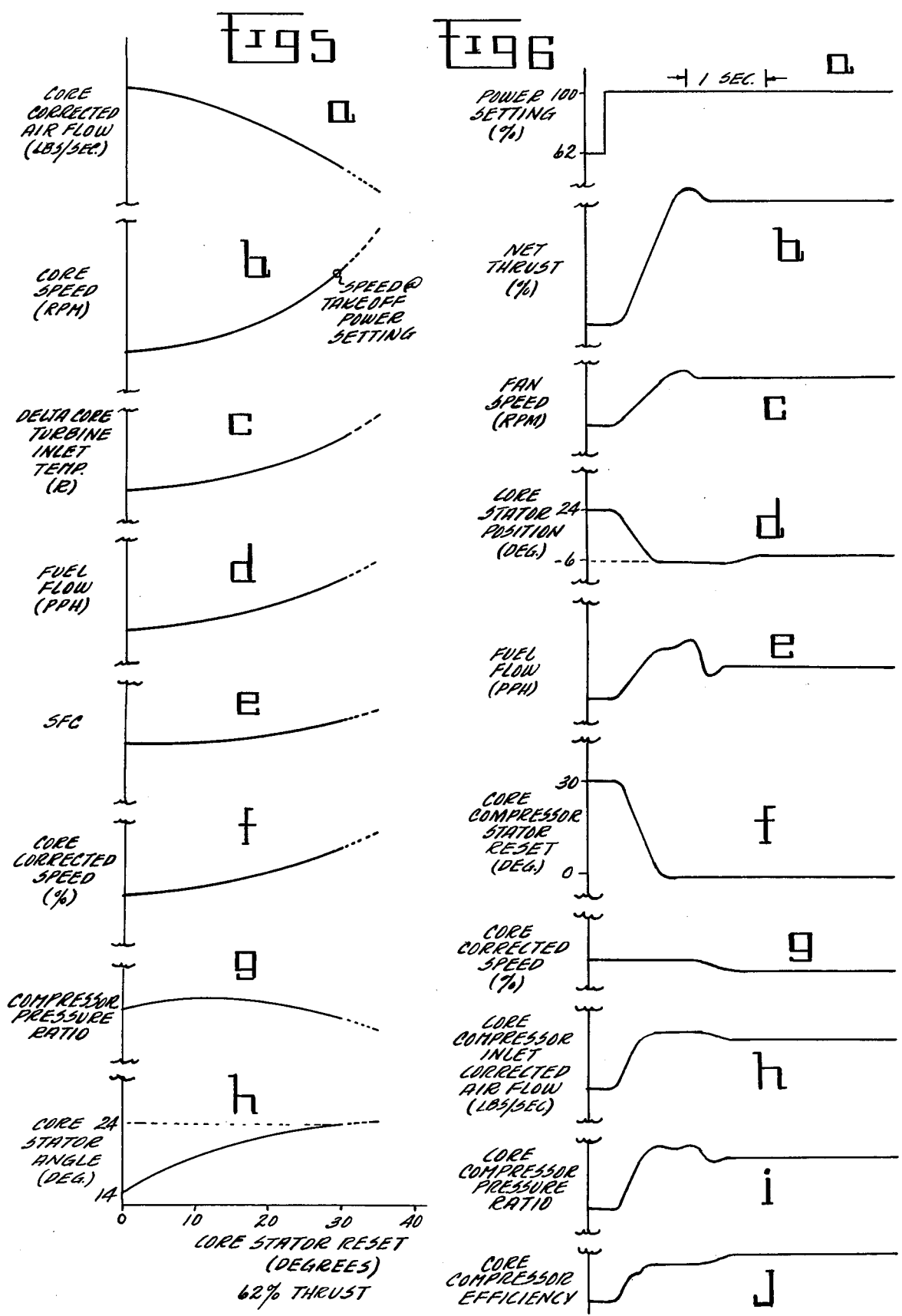

METHOD AND APPARATUS FOR RAPID THRUST INCREASES IN A TURBOFAN ENGINE

BACKGROUND OF THE INVENTION

This invention relates generally to gas turbine engines and, more particularly, to an engine control system for a turbofan engine having variable stators and a fuel control system responsive to fan speed.

The invention herein described was made in the perfomrance of work under a NASA contract and is subject to the provisions of Section 305 of the National Aeronautics and Space Act of 1958, Public Law 85-568 (72 Stat. 435; 42 USC 2457).

Historically, commercially flights have been characterized by takeoffs and landings which are relatively slow and time consuming and by intermediate relatively high speed cruising. Because of the great distances traveled, the cruise time made up the major portion of the total trip time, and rapid takeoffs and landings were not considered necessary. Further, for safety purposes it has been desirable to operate with long runways and relatively gradual takeoffs and landings.

Present-day requirements have been somewhat modified from the past in that there is now more concern about the noise and air polution which exists in airport vicinities because of the high-thrust, relatively inefficient engine operation during takeoffs and landings. Further, there now appears to be a greater need for short haul transport service. Accordingly, there is an effort in the industry to shorten the takeoff and landing periods of operation by aircraft improvisations and by engine design changes. One of the critical points of this manner of operation is that, when you are making a landing at a large descent rate and a go-around maneuver is suddenly necessary, the thrust must be quickly increased from a level of approximately one-half to two-thirds of takeoff thrust to full takeoff thrust in a very short period of time (approximately one second). Present aircraft engines do not provide this capability, primarily because of the high inertia of the compressor.

It is therefore an object of the present invention to provide an aircraft engine which facilitates rapid takeoffs and landings.

Another object of the present invention is the provision in an aircraft for negotiating a go-around maneuver when making a landing approach at a large descent rate.

Yet another object of the present invention is the provision in an aircraft engine for quickly accelerating from an approach thrust level to a takeoff thrust level.

Yet another object of the present invention is the provision in an aircraft engine for overcoming the problem of high compressor inertia when negotiating a go-around maneuver.

Still another object of the present invention is the provision in an aircraft engine for a control system which is effective in use and economical to manufacture.

These objects and other features and advantages become more readily apparent upon reference to the following description when taken in conjunction with the appended drawings.

SUMMARY OF THE INVENTION

Briefly, in accordance with one aspect of the invention, a turbofan engine whose fuel control is responsive to fan speed is temporarily run off its design point by substantially closing the compressor stators and allowing the compressor speed to increase in order to maintain a given fan speed and thrust level. subsequently, when the increased thrust level is required, the throttle is advanced to demand a takeoff thrust level and the stators are opened. This results in a rapid increase in both temperature and volume of the airflow to the turbine to thereby rapidly increase the fan speed and the thrust level of the engine.

By another aspect of the invention, the compressor stator is temporarily closed by modifying the normal schedule of a variable angle compressor stator. This is accomplished by adding a predetermined signal to the normal schedule digital signal which goes to the torque motor for rotating the stator. Provision is also made for limiting the rate at which the normal signal is modified.

By yet another aspect of the invention, the stator modifying or reset schedule is generated as a function of the throttle position, and provides a substantially constant signal over a range of throttle positions and then rapidly decreases to zero near the throttle position level associated with takeoff thrust. This allows the reset function to be removed and the stators to be opened when the takeoff thrust level is demanded.

In the drawings as hereinafter described, a preferred embodiment is depicted; however, various other modifications and alternate constructions can be made thereto without departing from the true spirit and scope of the invention.

BRIEF DESCRIPTION OF THE DRAWINGS

FIG. 5 is a steady-state, graphic illustration of selected parameters as a function of core stator reset angle; and FIG. 6 is a graphic illustration of transient responses when the throttle position is advanced to accommodate a go-around maneuver.

DESCRIPTION OF THE PREFERRED EMBODIMENT

Figure 1:
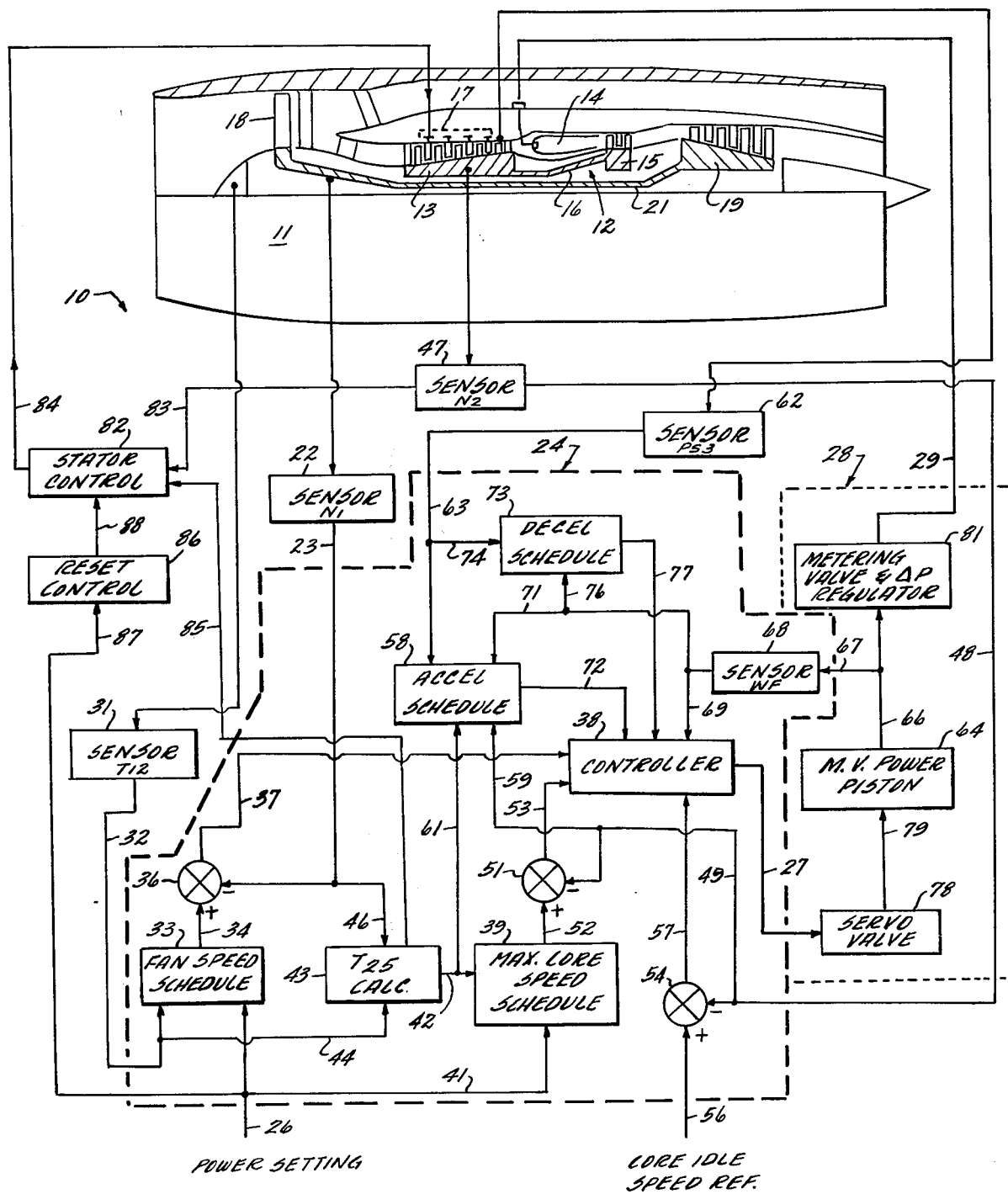
FIG. 1 is a schematic illustration of the fan speed control of a turbofan engine to which the present invention relates.

Referring now to FIG. 1, the invention is shown generally at 10 as incorporated in a control structure of a turbofan engine 11 having a core engine 12 which compresses in serial flow relationship a compressor 13, a combustor 14 and a high pressure turbine 15. The compressor 13 is drivingly connected to the high pressure turbine 15 by a core rotor 16 and operates in cooperation with the stationary stator 17 which is of the variable angle type. The low pressure system of the engine comprises a fan 18, a low pressure turbine 19 and an interconnecting low pressure shaft 21.

Since in a turbofan engine the thrust varies directly with the amount of airflow through the fan and thus the speed of the fan, the thrust level of the engine is controlled by controlling fan speed. The actual speed of the fan $N_1$ is determined by a sensor 22, using a magnetic teeth counter or the like, and the signal is passed along line 23 to the fuel control 24 where it is compared with a signal representative of the throttle angle or power setting which is transmitted along line 26. The resulting signal is transmitted from the fuel control 24 along line 27 to the mechanical fuel pumping and metering system 28 which, in turn, sends fuel to the combustor along line 29 at a rate which tends toward the desired thrust level as represented by the throttle angle.

Referring now more specifically to the fuel control 24, which is preferably of the digital electronic type, the fan inlet temperature ($T_{12}$) is determined by a sensor 31 and the representative signal passes into the fuel control 24 by line 32. From the engine inlet temperature ($T_{12}$), a value of maximum fan speed is computed, and a fan speed schedule 33 is then generated as a percentage of the maximum fan speed which is called for by the power setting from the aircraft along line 26. This power setting may be in the form of a digital electrical input supplied either by the pilot or the aircraft flight control computer. From this fan speed schedule 33, the representative signal passes along line 34 to a summer 36 which compares the desired thrust or fan speed signal with that of the actual fan speed signal received along line 23. A resultant error signal passes from the summer 36 along line 37 to the controller 38. The controller then acts in response to the error signal and various other limiting signals to present an output signal along line 27 to the fuel pumping and metering system 28.

For purposes of safety and life, it is desirable to control the operation within certain parameters as determined by predetermined speeds, temperatures and stall margins. Therefore, in addition to the error signal along line 37, the controller 38 receives certain limiting signals which act to modulate the controller 38 in the safest direction.

Two of the limits which are controlled are those of maximum and idle core speed limits. A maximum core speed schedule 39 is generated as a function of the power setting signal along line 41 and the compressor inlet temperature ($T_{25}$) along line 42. The compressor inlet temperature ($T_{25}$) can be sensed directly from the engine or, in the case of a low pressure ratio fan, it may be calculated by a computer 43 which receives a fan inlet temperature signal along line 44 and the fan speed signal along line 46 as shown. The actual core speed $N_2$ of the engine is determined by a sensor 47 which transmits a representative signal along lines 48 and 49 to a summer 51. The summer 51 then compares the actual core speed signal $N_2$ and the maximum core speed schedule signal as received along line 52 to generate a core speed limiting signal which is transmitted to the controller along line 53. The core idle speed limit operates in a similar manner with the summer 54 receiving the actual core speed signal $N_2$ along line 48 and the core idle speed reference signal along line 56 to generate a minimum core speed signal which is sent to the controller 38 along line 57. Other limiting functions included in system are those of the WF/$PS_3$, acceleration/deceleration transient fuel flow limits. Two of the parameters which are fed into the acceleration schedule 58 are the core speed signal $N_2$ along line 59 and the compressor inlet temperature ($T_{25}$) along line 61. The third parameter, compressor discharge pressure ($PS_3$), is determined by a sensor 62 and is transmitted along line 63 to the acceleration schedule generator 58. A fourth parameter applied to the acceleration schedule generator 58 is that of fuel flow (WF). This signal originates in the fuel pumping and metering system 28 wherein the position of the metering valve power piston 64 is sensed (via lines 66 and 67) by a demodulator sensor 68, which generates the digital signal WF representative of the fuel flow. The signal goes directly to the controller along line 69 and to the acceleration schedule generator along line 71. In response to the four parameters described hereinabove, the acceleration schedule generator 58 the outputs a signal along line 72 to the controller to limit accelerations to a safe level. Similarly, a deceleration schedule generator 73 receives a compressor discharge pressure ($PS_3$) signal along line 74 and the fuel flow (WF) signal along line 76 to generate a signal which is passed along line 77 to the controller to limit decelerations to a safe level.

In response to the error signal received along line 37, the fuel flow WF signal along line 69, and the limiting signals received from respective lines 53, 57, 72 and 77, the controller transmits a digital electronic control signal along line 27 to the servovalve 78 of the fuel pumping and metering system 28. In turn, the servovalve 78 provides the hydraulic output along line 79 to the metering valve power piston 64. The metering valve power piston 64 then presents an output along line 66 to the metering valve and $\Delta$ P regulator 81 which then provides a flow of fuel to the combustor along line 29.

Figure 2:
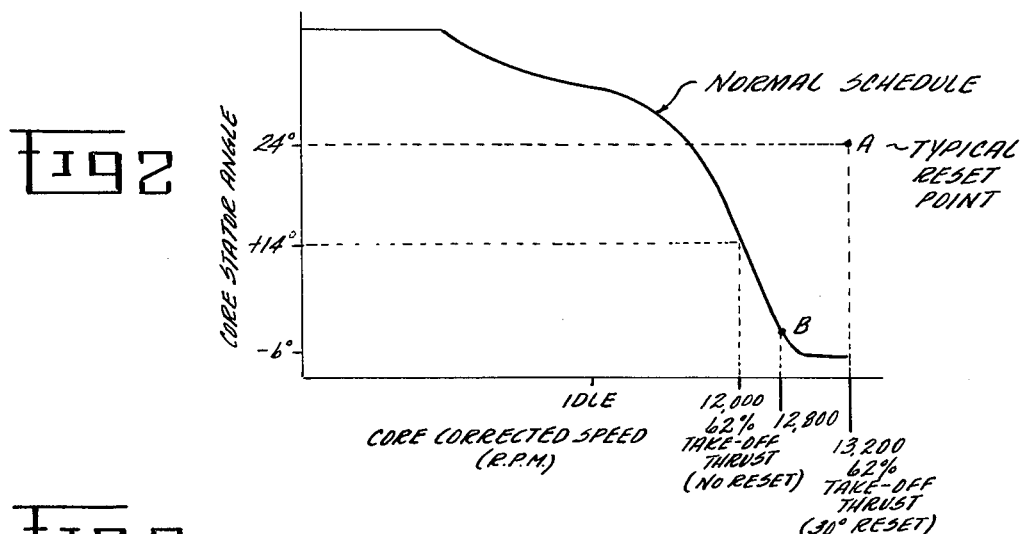
FIG. 2 is a graphic illustration of a core stator schedule as modified in accordance with the present invention.

In a turbofan engine having variable compressor stators, the stator control 82 normally receives along line 83 a signal representative of core speed $N_2$ and along line 85 a signal representative of $T_{25}$. It then transmits along line 84, in accordance with a predetemined schedule, a signal for varying the angle of the stators 17. Shown in FIG. 2 is a representative schedule of the core stator angle plotted as a function of the core corrected speed. It is contemplated by the present invention to modify this schedule during predetermined periods of operation by a reset control 86 which receives along line 87 in FIG. 1 a signal representative of the power setting and transmits along line 88 a biasing signal to the stator control 82.

Figure 3:
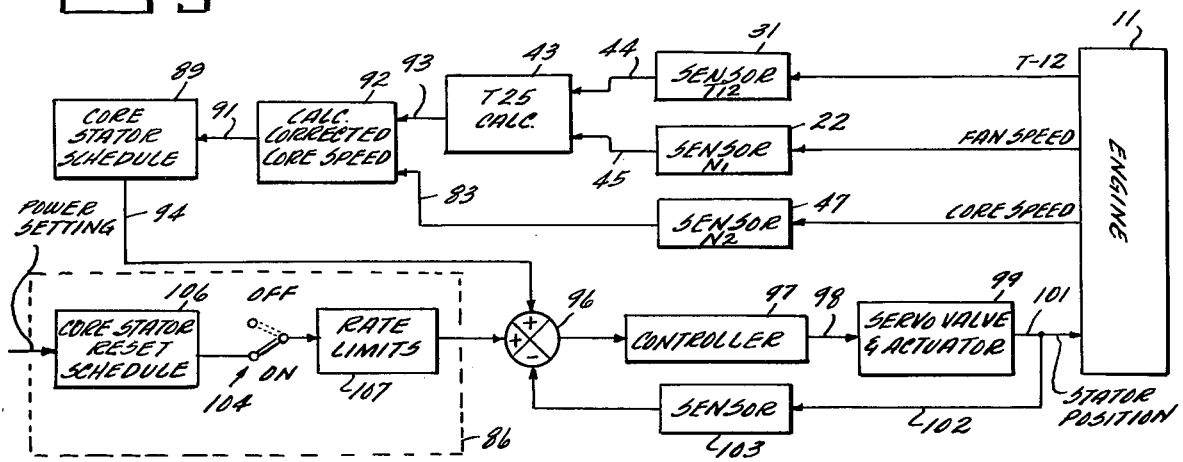
FIG. 3 is a schematic illustration of a core compressor stator control in accordance with the present invention.

Referring now to FIG. 3, the compressor stator control apparatus is shown in more detail, with the digital electronic control portion receiving hydromechanical control parameters from the engine and transmitting a hydromechanical control signal to modify the position of the stator. The normal core stator schedule 89 is generated in response to the corrected core speed received along line 91 from the calculator 92. The corrected core speed is obtained as a function of core speed $N_2$ which is received along line 83 and of the compressor inlet temperature ($T_{25}$) which is received along line 93. The core stator schedule, as represented by the solid line graph of FIG. 2, is then transmitted along line 94 to a summer 96. In the conventional operation of a stator control, the scheduled signal then passes to a controller 97 which provides an electrical input along line 98 to a servovalve and actuator 99 which, in turn, provides mechanical input along the linkage 101 to modify the position of the stators. A feedback circuit 102 with an included sensor 103 provides signals back to the summer 96 to complete the closed loop system.

Figure 4:
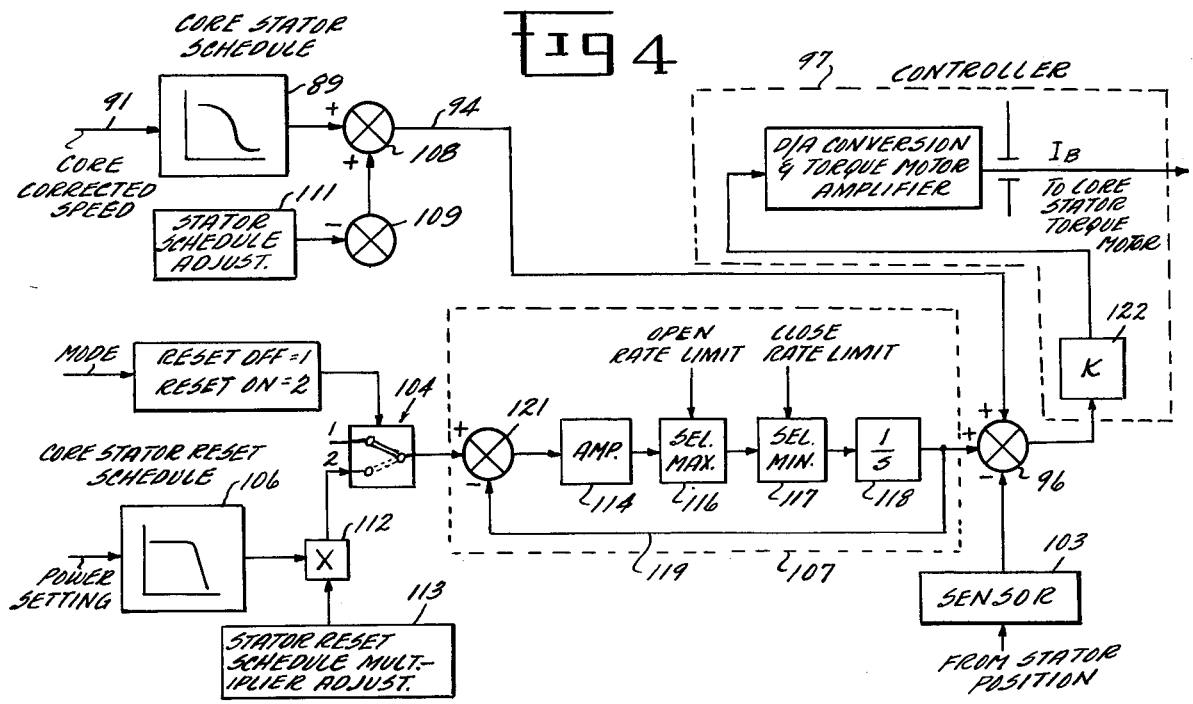
FIG. 4 is a block diagram of the compressor stator reset control system in accordance with the present invention.

In accordance with the present invention the normal core stator schedule is modified at the summer 96 by selective application of the reset control 86. When the reset switch 104 is off, the system works in the conventional manner as described hereinabove. When the switch 104 is on as shown, a core stator reset schedule 106 is generated as a function of the throttle angle or power setting. This reset schedule signal, after passing through, and possibly being modified by, the rate limit circuit 107, then feeds the summer 96 for modification of the normal core stator schedule signal, as will be more fully discussed hereinafter. A more detailed representation of the reset control 86 is shown in FIG. 4.

A normal core stator schedule 89 is generated as a function of core corrected speed, and a representative signal passes along line 94 to the summer 96. Provision is made in line 94, by way of summers 108 and 109 and a stator schedule adjustor 111, such as a potentiometer or the like, to selectively modify the schedule as desired for a particular application. At the same time, a core stator reset schedule 106 is generated as a function of the power setting and this signal is passed through the switch 104 when it is placed in the on position. A multiplier 112 and an adjustor 113 are placed within the circuit to modify the reset schedule as desired. The reset signal then passes to the rate limit circuit 107 where it is amplified by an amplifier 114 and then passes through the maximum and minimum limit circuits 116 and 117, respectively. These circuits function to limit the rate at which the reset signal is applied to the normal core stator schedule, the minimum rate circuit 117 acting to limit the rate at which the stator is closed and the maximum rate circuit 116 functioning to limit the rate at which it is subsequently opened. After passing through the limit circuits 116 and 117, the signal passes through an integrator 118 and thence to the summer 96 where it is applied to modify the core stator schedule. A feedback circuit 119 feeds back into a summer 121 to provide a closed-loop system. The modified core stator schedule which results at the output of the summer 96 passes to the controller 97 which comprises a constant gain 122, a digital-to-analog converter, and a torque motor amplifier. The resulting signal passes to the core stator torque motor to rotate the stator about a prescribed angle.

Since the present invention is designed for use in go-around maneuvers, let us assume that the thrust level at approach is approximately 62 percent of that at takeoff, and the requirement is to rapidly increase from the 62 percent takeoff thrust to one hundred percent takeoff thrust. It is contemplated in the present invention that in anticipation, of this thrust requirement, the reset switch 104 be turned on and that the normal core stator schedule 89 be modified by the reset schedule 106 so as to increase the speed of the core engine to thereby reduce the requirements for overcoming its inertia during the short period in which the rapid thrust increase is desired.

In operation then, the reset control 86 remains turned off for normal flight operation. However, in preparation for a landing, the switch 104 is turned on and the reset schedule sends a signal representative of a 30° stator change. The minimum select circuit 117 then allows this signal to be added to the normal stator schedule signal at a prescribed rate to obtain a modified core stator schedule which tends to close down the stators. As the stators are closed down, the core airflow tends to decrease, which in turn tends to decrease the low pressure turbine and fan speeds. Since the fuel control 24 is sensitive to fan speed it tends to increase the fuel flow in order to maintain the power demanded. As a result the fan speed is maintained constant and the core speed is substantially increased to an off-design, inefficient speed level. The engine is temporarily run in this relatively high specific fuel consumption (SFC) condition in order to maintain the high speed which is required of the core compressor for subsequent acceleration to takeoff thrust levels. If and when a go-around maneuver is deemed necessary, the throttle is advanced to the takeoff power setting and the reset schedule 106 changes from a 30° output signal to a 0° output signal. The maximum select circuit 116 then operates to allow the reset signal change to be applied to the normal core stator schedule 89 at a prescribed rate. It has been determined experimentally that for a rapid increase of thrust from 62 percent to 100 percent of takeoff thrust, it was necessary to open the stators at a rate of at least 30° per second. However, in order to allow for design tolerances and safety margins, it is desirable that this rate of removing the core stator reset signal be established at 60° per second. Thus, when the throttle is advanced, the stators are opened, the fuel flow is increased, the core corrected airflow is increased and, as a result the fan speed and net thrust are rapidly and substantially increased to the desired takeoff level. The switch 104 can then be turned off at the convenience of the operator.

Referring now to FIG. 5, it can be seen that in steady-state operation at a thrust level of 62 percent of takeoff thrust, by a resetting or a closing down of the stator by angles up to 30°, various parameters of the engine are substantially modified. It can be seen in FIG. 5a that as the core stator is reset or closed to angles up to 30°, the core corrected airflow is substantially decreased accordingly. Similarly, in FIGS. 5b, c, d, e and f, it can be seen that the core speed, change in core turbine inlet temperature, fuel flow, specific fuel consumption (SFC) and the core corrected speed, respectively, are increased accordingly. Because of the reduced airflow, the compressor pressure ratio is reduced as shown in FIG. 5g. The core stator angle as determined by both the normal schedule input and the core stator reset up to an angle of 30° is shown in FIG. 5h. As can be seen, with application of a 30° reset, the final core stator angle increases from approximately 14° to 24°. This apparent discrepancy can be explained by the fact that, as the reset signal is tending to close the compressor stator, the core corrected speed is increasing as shown in FIG. 5f and therefore the normal stator schedule is tending to move the stator to a more open position. The combined result is that for a 30° core stator reset, the core stator angle is only moved 10° toward the closed position. This can be better understood by reference to FIG. 2 wherein the core stator angle is shown in accordance with the normal core stator schedule (solid line graph), and as it is modified by a 30° reset (point A). In normal operation (with the reset control off), when the engine is operating at 62% of rated takeoff thrust (approximately 12,000 rpm), the core stator angle as determined by the normal stator schedule is approximately 14°. When the reset control is turned on, the core corrected speed increases as shown in FIG. 5f to a speed of approximately 13,200 rpm. At this core corrected speed, the normal stator setting is completely open or minus 6°. However, with the 30° correction as incorporated by the reset control system, the resulting stator angle will be substantially closed at plus 24° as shown by point A in FIG. 2. When the throttle is subsequently moved to the takeoff position for a go-around maneuver, the core corrected speed is already somewhat above the final speed and, in fact, will be slowed down. Further, the reset function will be automatically eliminated so that the position of the core stator will again be determined by the normal stator schedule. Thus, if the throttle is moved to the position representative of takeoff thrust (approximately 12,800 rpm), then the core stator angle will initially open to minus 6° and, as the core corrected speed decreases to 12,800 rpm, the core stator angle will close to approximately minus 2° as shown by point B of the graph of FIG. 2.

Referring now to FIG. 6, there is shown as a function of time, the various changes in selected parameters as a result of moving the power setting or throttle angle to that of demanding 100 percent takeoff thrust as represented in FIG. 6a. FIGS. 6b and 6c indicate that the net thrust and fan speed, respectively, are rapidly and substantially increased. As indicated in FIG. 6d, the core stator position moves initially from a plus 24° to the minus 6° position and then eventually to the minus 2° position which is the normal core stator schedule position for a core corrected speed representative of takeoff thrust (12,800 rpm.) The fuel flow, as shown in FIG. 6e, rapidly increases due to the increase in power demand, and then drops off and evens out when the fan speed reaches the level required for the desired thrust demand. FIG. 6f indicates that the core compressor stator error (from the reset control) goes from plus 30 to 0. The core corrected speed is reduced from 13,200 rpm to 12,800 rpm as indicated in FIG. 6g but the core compressor inlet corrected airflow is substantially increased since the core stator is suddenly opened by 30°. As the core stator subsequently closes a few degrees as shown in FIG. 6d, the corrected airflow then is reduced slightly as shown in FIG. 6h. As shown in FIG. 6i, the core compressor pressure ratio generally follows the same trend as the corrected airflow. Since the compressor, while operating in the reset mode, was operating off design, and therefore inefficiently, a moving out of the reset mode causes an associated increase in compressor efficiency as shown in FIG. 6j.

Therefore, having described a preferred embodiment of the invention, though not exhaustive of all possible equivalents, what is desired to be secured by Letters Patent of the United States is claimed as follows:

1. In a turbofan engine having a fuel control which operates in response to both sensed fan speed and throttle position, and a compressor stator whose normal angle schedule is controlled by a stator control in response to core speed, an improved stator control comprising:
   means for generating a reset signal as a function of throttle position; and
   means for modifying said normal stator angle schedule by application of said reset signal to said stator control.

2. An improved stator control as in claim 1 wherein said normal stator angle schedule is modified so as to move the stator to a more closed position to thereby result in a higher core speed for a given fan speed.

3. An improved stator control as in claim 2 wherein said reset signal is scheduled for a predetermined range of throttle positions.

4. An improved stator control as in claim 2 wherein said reset signal decreases in proportion to the degree of advancement of said throttle position over a predetermined range of throttle positions.

5. An improved stator control as in claim 2 wherein said reset signal is zero for all throttle positions above a predetermined position.

6. An improved stator control as in claim 1 wherein said normal stator angle is modified by an angle schedule within the range of 0° to 40°.

7. An improved normal stator control as in claim 1 wherein said stator angle schedule is modified within a time period of one second.

8. An improved stator control as in claim 1 wherein said normal stator angle schedule is modified at a minimum rate of 30° per second.

9. An improved stator control as in claim 1 wherein said normal stator angle schedule is modified so as to move the stator to a more open position to thereby result in a higher fan speed for a given core speed.

10. In a turbofan engine having a fuel control which operates in response to both sensed fan speed and throttle position, a method of varying the compressor stator angle comprising the steps of:
    generating a first signal as a function of core speed;
    generating a second signal as a function of throttle position;
    summing said first and second signals to obtain a control signal; and
    varying the compressor stator angle in response to said control signal.

11. The method of claim 10 wherein the step of generating said first signal includes the steps of converting to core corrected speed.

12. The method of claim 10 wherein said second signal is generated for a predetermined range of throttle positions.

13. the method of claim 10 wherein said second signal generated decreases in proportion to the degree of advancement of said throttle position over a predetermined range of throttle positions.

14. The method of claim 10 wherein said second signal generated is zero for all throttle positions above a predetermined position.

15. The method of claim 10 wherein the summing step includes the additional step of limiting the rate a which the summing step occurs.

16. The method of claim 15 wherein the limiting step provides for summing at one rate when said second signal is increasing and at another rate when said second signal is decreasing.

17. The method of claim 10 wherein, when said second signal is increasing, said stator angle is varied so as to close the stator angle and when it is decreasing said stator angle is varied so as to open the stator angle.

18. The method of claim 17 and including the additional step, when said second signal is increasing, of allowing the core speed to increase while maintaining a substantially constant fan speed.

19. The method of claim 17 and including the additional step, when said second signal is decreasing, of allowing the fan speed to increase.

20. The method of claim 19 and including the additional step of allowing the core speed to decrease.

21. In a turbofan engine having a variable compressor stator whose angle is normally varied in accordance with a schedule responsive to core speed and a fuel control which operates in response to both sensed fan speed and throttle position, a method of facilitating a rapid change from a first thrust output level to a substantially increased second thrust output level comprising the steps of:
    varying the normal stator angle schedule so as to move the stator toward the closed position; and
    allowing the speed of the compressor to increase to the level required to maintain the first thrust output level.

22. The turbofan engine of claim 21 wherein the normal stator angle schedule is varied by an angle in the range of 0° to 40°.

23. The turbofan engine of claim 21 wherein the rate at which the normal stator angle schedule is varied is limited.

24. The turbofan engine of claim 21 and including the subsequent step of moving the stator to a more open position to substantially increase the amount of air to the turbine to thereby increase the fan speed.

25. The turbofan engine of claim 24 wherein the rate at which the stator is moved to a more open position is limited.

26. the turbofan engine of claim 24 and including the additional step of advancing the throttle to a position commensurate with the second thrust output level.

* * * * *

UNITED STATES PATENT AND TRADEMARK OFFICE
CERTIFICATE OF CORRECTION

PATENT NO. : 4,184,327
DATED : January 22, 1980
INVENTOR(S) : Jack E. Cornett, et al.

It is certified that error appears in the above-identified patent and that said Letters Patent are hereby corrected as shown below:

Column 7, claim 6, line 67, after "angle", first occurrence thereof, insert --schedule--; and line 67-68, after "angle", second occurrence thereof, delete "schedule".

Column 8, claim 7, line 1, after "improved", delete "normal"; and line 2, after "said", insert --normal--.

Column 8, claim 13, line 28, change "the" to --The--.

Column 10, claim 26, line 6, change "the" to --The--.

Signed and Sealed this

Twenty-second Day of July 1980

[SEAL]

Attest:

SIDNEY A. DIAMOND

Attesting Officer    Commissioner of Patents and Trademarks